United States Patent
Miao (10) Patent No.: US 11,090,555 B2
(45) Date of Patent: Aug. 17, 2021

(54) INFORMATION PROCESSING METHOD AND APPARATUS, STORAGE MEDIUM AND ELECTRONIC DEVICE

(71) Applicant: NETEASE (HANGZHOU) NETWORK CO.,LTD., Zhejiang (CN)

(72) Inventor: Qingbo Miao, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 2 days.

(21) Appl. No.: 16/136,293

(22) Filed: Sep. 20, 2018

(65) Prior Publication Data
US 2019/0111335 A1    Apr. 18, 2019

(51) Int. Cl.
| A63F 13/2145 | (2014.01) |
| A63F 13/5375 | (2014.01) |
| A63F 13/5372 | (2014.01) |
| A63F 13/95 | (2014.01) |
| A63F 13/5255 | (2014.01) |
| A63F 13/42 | (2014.01) |

(52) U.S. Cl.
CPC ...... *A63F 13/2145* (2014.09); *A63F 13/5255* (2014.09); *A63F 13/5372* (2014.09); *A63F 13/5375* (2014.09); *A63F 13/95* (2014.09)

(58) Field of Classification Search
CPC ............... A63F 13/426; A63F 13/2145; A63F 13/5255; A63F 13/5372; A63F 13/5375; A63F 13/95; G06F 3/0481; G06T 11/001; G06T 11/60; G06T 2200/24
See application file for complete search history.

(56) References Cited

U.S. PATENT DOCUMENTS

| 2007/0060346 A1 | 3/2007 | Edwards |
| 2010/0113149 A1 | 5/2010 | Suddreth et al. |

FOREIGN PATENT DOCUMENTS

| CN | 105194875 A | 12/2015 |
| CN | 105597310 A | 5/2016 |
| CN | 106354418 A | 1/2017 |
| CN | 106453638 A | 2/2017 |

(Continued)

OTHER PUBLICATIONS

Fallout New Vegas—Ultimate Edition—Game Manual, 2012, Bethesda Softworks. (Year: 2012).*

(Continued)

*Primary Examiner* — Werner G Garner
(74) *Attorney, Agent, or Firm* — Gang Yu (57) ABSTRACT

An information processing method and apparatus, a storage medium, and an electronic device are provided. The method includes: marking location information sent by a network side is received, the marking location information at least including location information of the game scene; an marking location is determined in a game scene according to the location information of the game scene, and direction information of the marking location is acquired; a direction indicator is provided on the GUI, the direction indicator including a direction identifier for identifying a direction; and at a position corresponding to the direction identifier corresponding to the direction information, a graphical identifier corresponding to the direction information of the marking location is generated.

18 Claims, 3 Drawing Sheets

(56) References Cited

FOREIGN PATENT DOCUMENTS

| CN | 106512406 A | 3/2017 |
|---|---|---|
| JP | 2010035908 A | 2/2010 |
| JP | 2010068872 A | 4/2010 |
| JP | 2015215532 A | 12/2015 |
| JP | 2016131662 A | 7/2016 |
| JP | 201755955 A | 3/2017 |

OTHER PUBLICATIONS

Pacific Fighters—User Manual, 2004, 1C Company. (Year: 2004).*
Greymonk, "Stupid question: How do you remove a map marker once it's placed? (PC)?", reddit.com, 2015, available at <<https://www.reddit.com/r/Fallout/comments/3smj0r/stupid_question_how_do_you_remove_a_map_marker/>>. (Year: 2015).*
Bearcat, Nugget's Guide to Getting off the Ground in IL2, Jan. 5, 2013, IL-2 Sturmovik Forum. (Year: 2013).*
Domflamingo Jiu ming pang: Skydiving and choosing a map can be tricky ! Essential for Player unknown pattlegrounds, Jedi survival is a must for beginners. Bilibili video, Oct. 3, 2017, pp. 1-4, https://www.bilibili.com/video/av15040584/.
Mi Ge Commentary: "Try out the new game mi ge" The computer version of PlayerUnknown's Battlegrounds Netease terminator 2 Hand game , Bilibili video, Oct. 1, 2017, pp. 1-4 , https://www.bilibili.com/video/av14942716?from=search&seid=67777361587422243913.
<Can I survive> YouTube [online] [video], Aug. 14, 2017 ; https://www.youtube.com/watch?v=Qhh0igzqtqY.
<Dompisha, Pochanko, Tower of Fort Knight>;YouTube [online] [video], Sep. 29, 2017; https://www.youtube.com/watch?v=mlSsqPsba6w.

\* cited by examiner

INFORMATION PROCESSING METHOD AND APPARATUS, STORAGE MEDIUM AND ELECTRONIC DEVICE

CROSS-REFERENCE TO RELATED APPLICATIONS

The present disclosure claims priority of Chinese Patent Application No. 201710953466.7, filed to China Patent Office on Oct. 13, 2017. Contents of the present disclosure are hereby incorporated by reference in entirety of the Chinese Patent Application.

TECHNICAL FIELD

The present disclosure relates to the technical field of human-computer interaction, and in particular to an information processing method and apparatus, storage medium and electronic device.

BACKGROUND

In games, especially in games with large maps (also called big scenes), if players are not familiar enough with a game map, they are easy to get lost in the game map and cannot reach the destination. Existing games generally adopt an automatic path finding to solve a problem of getting lost in the big map. That is, after the player determines the destination, the game controls a virtual character to automatically move to the destination.

The automatic path finding solves the problem of getting lost, but during a process of controlling the virtual character to move to the destination, the system need to have a complete control of a movement of the virtual character, and any control from the player can interrupt the automatic path finding, which may result in a poor experience.

SUMMARY

At least some embodiments of the present disclosure provide an information processing method and apparatus, a storage medium and electronic device.

In one embodiment of the present disclosure, an information processing method is applied to a mobile terminal which is rendered with a graphical user interface (GUI), contents rendered on the GUI at least partially includes a game scene and at least partially includes a virtual character. The method includes:
receiving marking location information sent by a network side, the marking location information at least comprising location information of the game scene; determining a marking location in a game scene according to the location information of the game scene, and acquiring direction information of the marking location; providing a direction indicator on the GUI, the direction indicator comprising a direction identifier for identifying a direction; and at a position corresponding to the direction identifier corresponding to the direction information, generating a graphical identifier corresponding to the direction information of the marking location.

In another embodiment of the present disclosure, an information processing apparatus is applied to a mobile terminal which is rendered with a GUI, contents rendered on GUI at least partially includes a game scene and at least partially includes a virtual character, the apparatus including:
a receiving component, configured to receive marking location information sent by a network side, the marking location information at least comprising location information of the game scene;
an marking location determination component, configured to determine a an marking location in the game scene according to the location information of the game scene, and acquire direction information of the marking location;
a direction indicator component, configured to provide a direction indicator on the GUI, the direction indicator comprising a direction identifier for identifying a direction;
a control component, configured to, at a position corresponding to the direction identifier corresponding to the direction information, generating a graphical identifier corresponding to the direction information of the marking location.

In another embodiment of the present disclosure, a computer-readable storage medium is provided, on which at least one computer program is stored, the at least one computer program being executed by at least one processor to implement the following steps:
receiving marking location information sent by a network side, the marking location information at least comprising location information of the game scene;
determining an marking location in a game scene according to the location information of the game scene, and acquiring direction information of the marking location;
providing a direction indicator on the GUI, the direction indicator comprising a direction identifier for identifying a direction; and
at a position corresponding to the direction identifier corresponding to the direction information, generating a graphical identifier corresponding to the direction information of the marking location.

In another embodiment of the present disclosure, an electronic device is provided, which includes:
at least one processor; and
at least one memory, configured to store at least one executable instruction of the at least one processor,
and the at least one processor is configured to execute the above information processing method by executing the at least one executable instruction.

DETAILED DESCRIPTION

Exemplary embodiments will now be described more comprehensively with reference to the drawings. However, the exemplary embodiments may be implemented in various forms and should not be understood to be limited to embodiments elaborated herein. On the contrary, these embodiments are provided to make the present disclosure comprehensive and complete and make the concept of the exemplary embodiments delivered to those skilled in the art comprehensively. The same reference numerals in the drawings denote the same or similar parts, and the repeated description thereof will be omitted.

In addition, described characteristics, structures or properties may be combined into one or more embodiments in any appropriate manner. Many specific details are provided in the following descriptions, thereby providing an adequate understanding to the embodiments of the present disclosure. However, those skilled in the art should realize that the technical solutions of the present disclosure may be implemented without one or more of the specific details, or other methods, components, materials, apparatuses, steps and the like may be adopted. Under other circumstances, well-known structures, methods, apparatuses, implementations, materials or operations are not shown or described in detail to avoid each aspect of the present disclosure being obscured.

The block diagrams shown in the figures are functional entities and do not necessarily have to correspond to physically separate entities. That is, these functional entities may be implemented in software, or these functional entities or some of the functional entities are implemented in one or more software-hardened components, or these functional entities are implemented in different networks and/or processor apparatuses and/or microcontroller apparatuses.

Figure 1:
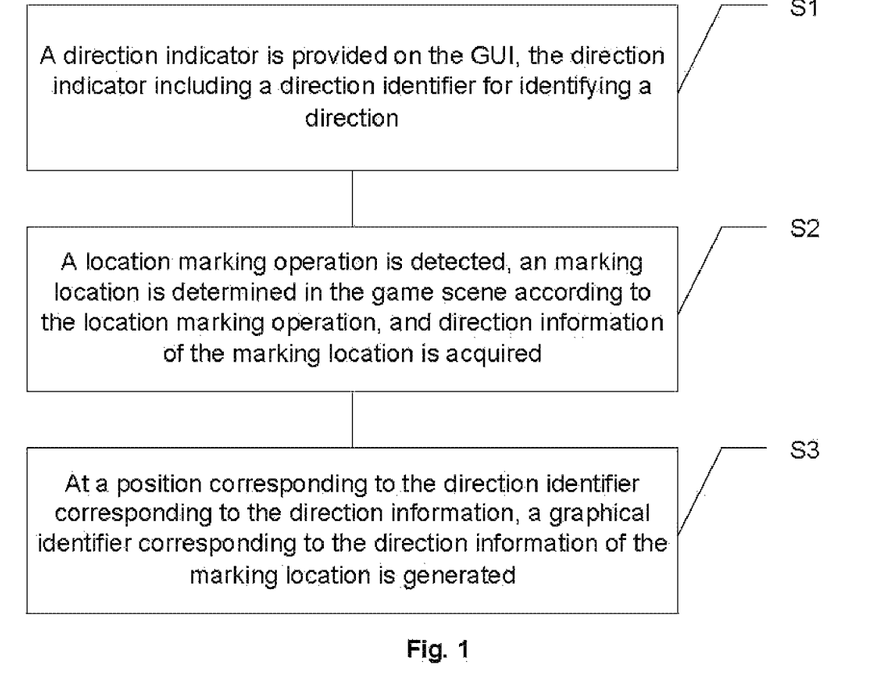
FIG. 1 is a flowchart of an information processing method according to an embodiment of the present disclosure.

In one embodiment of the present disclosure, an information processing method is applied to a mobile terminal which is rendered with a GUI, contents rendered on the GUI at least partially includes a game scene and at least partially includes a virtual character. The mobile terminal may be, for example, an electronic device having a touch screen such as a mobile phone, a tablet computer, a game machine, or a Personal Digital Assistant (FDA). Through executing, by the mobile terminal, a game application, a virtual character, a virtual joystick area, a virtual battle scene, a virtual natural environment and the like are displayed on the touch screen of the mobile terminal. The GUI may be an entire area of the touch screen or a partial area of the touch screen, which is not specifically limited in the exemplary embodiment. The virtual character is controlled by a player and is rendered on the GUI partially or entirely. For example, in a first person perspective, contents rendered on the GUI is presented in a main control perspective of the player, an immersive experience of the player is enhanced, and part of the virtual character, such as hands or feet of the virtual character, is rendered on the GUI. However, in a third person perspective, the virtual character may be rendered on the GUI as a whole, thereby reducing control difficulty and sense of vertigo of the player, and laying more emphasis on sense of motion of a game screen. A developer may choose a specific display mode according to contents to be rendered on the GUI, and the present disclosure is not limited to this. As shown in FIG. 1, the information processing method may include the steps as follows.

At step S1, a direction indicator is provided on the GUI, the direction indicator including a direction identifier for identifying a direction.

At step S2, a location marking operation is detected, an marking location is determined in the game scene according to the location marking operation, and direction information of the marking location is acquired.

At step S3, at a position corresponding to the direction identifier corresponding to the direction information, a graphical identifier corresponding to the direction information of the marking location is generated.

With providing the direction indicator on the GUI, the direction corresponding to the marking location is identified on the direction indicator by the graphical identifier according to the direction information of the marking location, so that the player can determine the direction of the marking location using the direction indicator, and avoids getting lost in a game map.

Furthermore, since a direction rather than a specific location is identified by the direction indicator, compared with a manner of directly marking the specific location in a thumbnail of the game scene, the method of the present embodiment cannot be affected by a distance between the marking location and the virtual character, and the present embodiment may display an accurate direction on the indicator regardless of the distance. By directly marking the specific location in the thumbnail, it may cause that displaying of the specific location cannot be realized since a distance between the marking location and a start location exceeds a preset distance and the marking location is outside a current display area of the thumbnail. Or, it is necessary to decrease a scale of the thumbnail to display the marking location, so that the marking accuracy is too low to have an accurate reference value.

Hereinafter, the information processing method in the present exemplary embodiment will be further described with reference to FIG. 1 to FIG. 6.

At step S1, the direction indicator is provided on the GUI, the direction indicator including a direction identifier for identifying a direction.

Figure 2:
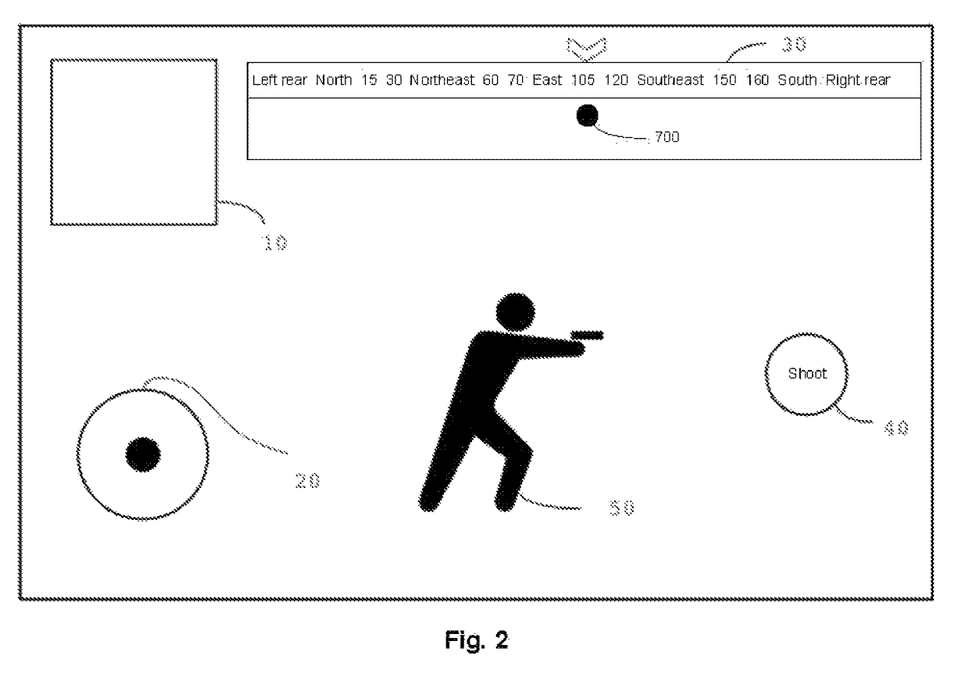
FIG. 2 is a schematic diagram of a GUI according to an exemplary embodiment of the present disclosure.
Figure 3:
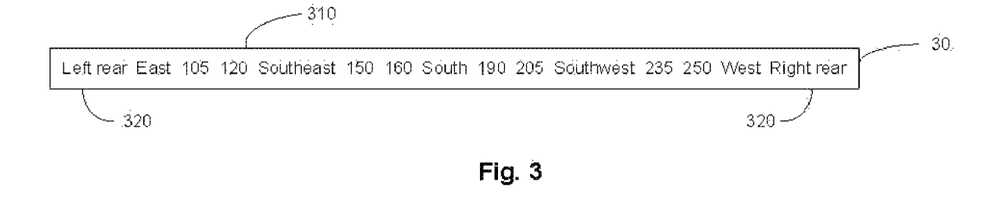
FIG. 3 is a structural schematic diagram of a direction indicator according to an exemplary embodiment of the present disclosure.

In the exemplary embodiment shown in FIG. 2, the GUI includes a moving control area 20 for controlling movement of a virtual character 50, a skill control 40 for controlling skill release, and a thumbnail 10 of the game scene for displaying a thumbnail game scene. The present exemplary embodiment provides a direction indicator 30 on the GUI. The direction indicator 30 includes the direction identifier for identifying the direction, and the direction identifier may include at least one of the following: a direction scale and a direction descriptor. The direction indicator 30 shown in FIG. 3 includes both a direction scale 310 represented by a numeral and a direction scale 310 represented by a text, and a direction descriptor 320. For example, numerals 105, 120, 150, etc. on the direction indicator are direction scales 310 represented by numerals, and texts east, southeast, south, southwest, etc. on the direction indicator are direction scales 310 represented by texts. The direction descriptor may adopt a text description mode or a graphic description mode. FIG. 2 shows a direction indicator 30 including a text descriptor, and the leftmost side displays "left rear", and the rightmost side displays "right rear". On the one hand, the direction descriptor reduces understanding difficulty of the direction indicator for the player; and on the other hand, due to the limited space of the screen, it may be difficult to display all scale ranges of 0-360 degrees of the direction indicator on the screen. Thus, details of partial scale area focused by players may be displayed on the screen, while other partial scale areas may be summarily displayed by the direction descriptor. In the exemplary embodiment shown in FIG. 3, the area behind the virtual character is summarily divided into a left rear area and a right rear area.

The direction indicator 30 may be in a form of a indicator as shown in FIG. 2, or may be in other forms that may identify a direction, such as a simulated compass or an arc dial.

At step S2, the location marking operation is detected, the marking location is determined in the game scene according to the location marking operation, and the direction information of the marking location is acquired.

In the present exemplary embodiment, the location marking operation of the player may be performed in various ways, for example:

In the exemplary embodiment as shown in FIG. 2, an operation of clicking the thumbnail 10 of the game scene may be taken as the location marking operation, and a position corresponding to a click location detected by the thumbnail 10 of the game scene is taken as the marking location. This mode is suitable for a case where display content of the thumbnail is thumbnail information of the entire game scene, because if the thumbnail displays a part of the game scene, the player cannot click to select the portion of the game scene that is not displayed.

Figure 4:
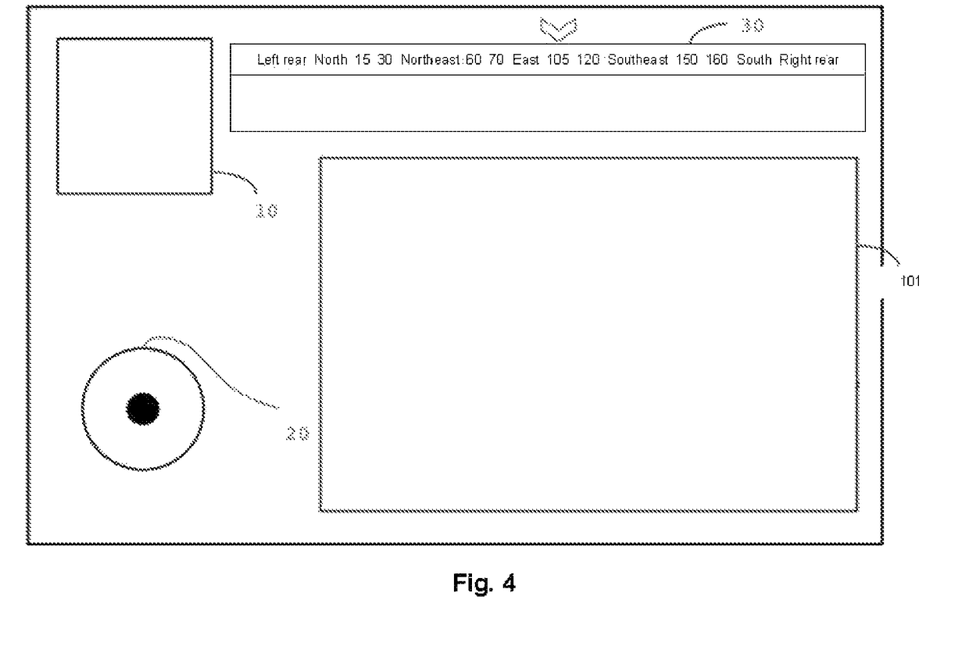
FIG. 4 is a schematic diagram of a GUI of a location marking operation state according to an exemplary embodiment of the present disclosure.

In the exemplary embodiment as shown in FIG. 4, for the case where the thumbnail 10 of the game scene displays thumbnail information of the partial game scene, a thumbnail 101 of a game panorama (i.e., a map of thumbnail information of the entire game scene) may be opened based on a preset operation (for example, an operation of clicking the thumbnail) of the player. Then, a touch operation of the player on the thumbnail of the game panorama (such as click, double click, long-press or re-press) is taken as a location marking operation, and a position corresponding to the touch operation location in the game scene is taken as the marking location.

As an alternative embodiment, there may be more than two marking locations. That is, the player may identify more than two marking locations.

Similarly, as an alternative embodiment, there may be only one marking location. For example, whenever the location marking operation is detected, an existing marking location is eliminated, and the marking location is re-determined by a current location marking operation.

In an alternative embodiment, the marking location eliminating control is provided on the GUI; and when a trigger operation acting on the marking location eliminating control is detected, the marking location and the graphical identifier corresponding to the marking location are eliminated.

When the marking location is determined, the direction information of the marking location is acquired. In one embodiment, the direction information type includes a relative direction information which is a direction information of the marking location relative to the virtual character (for example, a virtual character controlled by the player), or a direction information of the marking location in the game scene. In another embodiment, the direction information type includes both the relative direction information and the direction information of the marking location in the game scene. The type of the direction information displayed in the scene game may be determined according to an operation of a game developer or the player. On the one hand, a type of corresponding direction information may be selected according to information needed to be displayed by the player. For example, if the relative direction of the marking location relative to the virtual character needs to be identified, the relative direction may be selected, and otherwise, the direction information of the marking location in the game scene may be acquired. On the other hand, the selection may be performed according to convenience of data acquisition from a game engine, and if it is more convenient to acquire the relative direction, the relative direction may be adopted. In addition, since the marking location and the virtual character may be in a same coordinate system in the game scene, furthermore, the relative direction and a direction in the game scene may be mutually convertible. The direction of the marking location may also be calculated basing on coordinate information of the marking location, and the developer may also calculate the direction information according to the acquired coordinate information.

At step S3, at a position corresponding to the direction identifier corresponding to the direction information, a graphical identifier corresponding to the direction information of the marking location is generated.

As described above, the direction information may be the relative direction of the marking location relative to the virtual character, or may be the direction information of the marking location in the game scene. For ease of explanation, the present embodiment is illustrated by taking the direction information of the marking location in the game scene as an example in the present embodiment. In the exemplary embodiment as shown in FIG. 2, a circular graphic identifier 700 is generated at a position of 105 degrees southeast of the direction indicator, indicating that the marking location is located at a direction of 105 degrees southeast of the game scene.

As an alternative embodiment, not only the relative direction information of the marking location relative to the virtual character may be acquired, but also the relative distance of the marking location relative to the virtual character may be acquired. Moreover, a display form of the corresponding graphical identifier may be controlled according to the distance. In an optional embodiment, at least one of a size, a color, brightness, a transparency and a dynamic effect of the corresponding graphical identifier is controlled according to the distance. For example, the size of the graphic identifier 700 corresponds to the distance size.

In the present exemplary embodiment, the corresponding graphic identifier 700 may be controlled based on the relative distance of the marking location relative to the virtual character in the following manners.

In manner 1, the transparency of the graphical identifier is controlled basing on the relative distance of the marking location relative to the virtual character.

In the present exemplary embodiment, the transparency of the graphical identifier is negatively correlated to the distance between the marking location and the virtual character. That is, the longer the relative distance of the marking location relative to the virtual character is, the higher the transparency of the graphical identifier is, and also, the shorter the relative distance of the marking location relative to the virtual character is, the lower the transparency of the graphical identifier is. It is to be noted that the transparency of the graphical identifier is within a range of 100% to 0%. And when the transparency of the graphical identifier is 100%, the graphical identifier is totally transparent, and when the transparency of the graphical identifier is 0%, the graphical identifier is totally non-transparent.

In manner 2, the size of the graphical identifier is controlled based on the relative distance of the marking location relative to the virtual character.

In the present exemplary embodiment, the size of the graphical identifier is negatively correlated to the distance between the marking location and the virtual character. That is, the longer the relative distance of the marking location relative to the virtual character, the smaller the size of the graphical identifier is, and also, the shorter the relative distance of the marking location relative to the virtual character is, the larger the size of the graphical identifier is.

In manner 3, the brightness of the graphical identifier is controlled based on the relative distance of the marking location relative to the virtual character.

In the present exemplary embodiment, the brightness of the graphical identifier is negatively correlated to the distance between the marking location and the virtual character. That is, the longer the relative distance of the marking location relative to the virtual character is, the lower the brightness of the graphical identifier is. And also the shorter the relative distance of the marking location relative to the virtual character is, the higher the brightness of the graphical identifier is.

It is to be noted that the display form of any one, two, three or four of the size, color, brightness, transparency and dynamic effect of the corresponding associated graphical identifier may also be controlled based on the distance of the marking location relative to the virtual character.

As an alternative embodiment, the direction indicator is further configured to identify a current orientation of the virtual character in the game scene. For example, a forward direction of the virtual character under a current state is identified. The current orientation of the virtual character may be identified by using the same method as the method for identifying the marking location. For example, a graphical identifier representative of the virtual character is generated at a position corresponding to the direction indicator.

Figure 5:
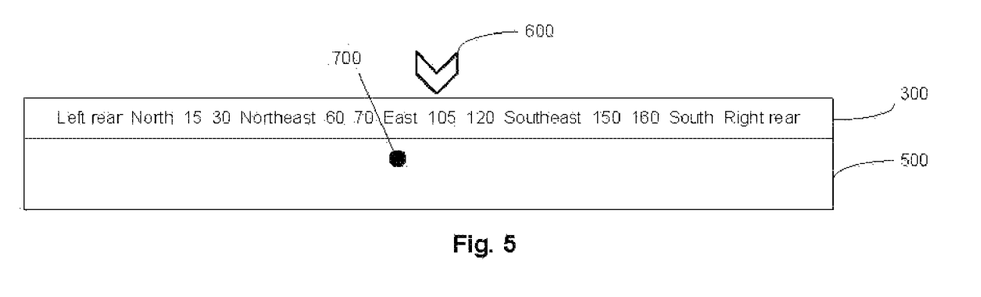
FIG. 5 is a schematic diagram of a marking state of a direction indicator when a virtual character is oriented 105 degrees southeast according to an exemplary embodiment of the present disclosure.
Figure 6:
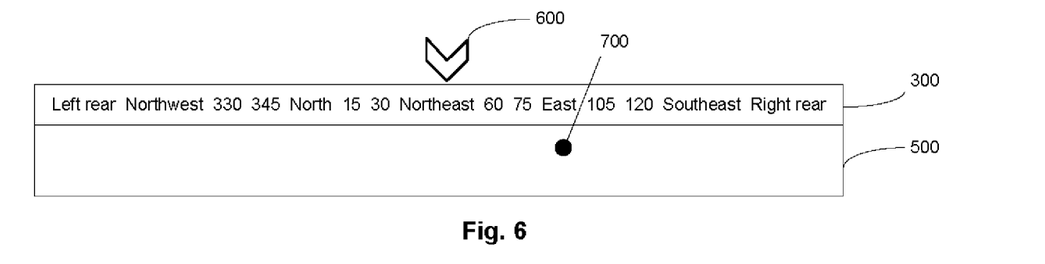
FIG. 6 is a schematic diagram of a marking state of a direction indicator when a virtual character is oriented to the northeast according to an exemplary embodiment of the present disclosure.

In the exemplary embodiment as shown in FIG. 2 and FIG. 5, an orientation indication control 600 may be rendered on the GUI, and the direction indicator 30 is controlled to move in the GUI according to the current orientation, such that a position corresponding to the current orientation on the direction indicator 30 is at an indication location of the orientation indication control 600. In the present embodiment, a position of the orientation indication control 600 is fixed, and an orientation of the virtual character is always the direction pointed by the orientation indication control 600 through moving the direction indicator. In such a way, the orientation indication control 600 may provide direction reference information for the player while indicating the orientation. When the graphical identifier 700 of the marking location is at a position indicated by the orientation indication control 600, it is indicated that the marking location is right forward the current orientation of the virtual character. When the graphical identifier 700 of the marking location is on the right side of the indication location of the orientation indication control 600, it is indicated that the marking location is on the right side of the current orientation of the virtual character. When the graphical identifier 700 of the marking location is on the left side of the indication location of the orientation indication control 600, it is indicated that the marking location is on the left side of the current orientation of the virtual character. Therefore, it is convenient for the player to control the orientation of the virtual character to determine the moving direction to approach or move away from the marking location. For example, the indication location of the orientation indication control 600 in FIG. 5 is 105 degrees southeast, which indicates that the current orientation of the virtual character is 105 degrees southeast. At this time, the graphic identifier 700 is located on the due east scale of the direction indicator, and is located at the left side of the orientation indication control 600, which indicates that the marking location is on the left side of the virtual character. When the virtual character is rotated to the left to the northeast orientation, as shown in FIG. 6, the direction indicator 30 moves in the GUI, such that the northeast orientation is located at the indication location of the orientation indication control 600. At this time, the graphical identifier 700 of the due east direction is located on the right side of the orientation indication control 600 due to the movement of the direction indicator 30, which indicates that the marking location is on the right side of the virtual character.

The orientation indication control 600 may take a form of a triangle, an arrow or other graphic styles, which is not limited in the present disclosure.

In an alternative embodiment, when the contents rendered on the GUI further includes a thumbnail of the game scene for displaying thumbnail information of the entire or partial game scene, the marking location may also be identified in the thumbnail of the game scene while being identified on the direction indicator.

In the exemplary embodiment of the present disclosure, an information processing apparatus is also applied to a mobile terminal which is rendered with a GUI, contents rendered on the GUI at least partially includes a game scene and at least partially includes a virtual character. The apparatus includes:

a direction indicator component, configured to provide a direction indicator on the GUI, the direction indicator including a direction identifier for identifying a direction;

a detection acquisition component, configured to detect a location marking operation, determine an marking location in the game scene according to the location marking operation, and acquire direction information of the marking location; and a control component, configured to, at a position corresponding to the direction identifier corresponding to the direction information, generate a graphical identifier corresponding to the direction information of the marking location.

The specific details of the components in the above information processing apparatus have been described in detail in the corresponding information processing method, and therefore will not be described here.

It should be noted that although several components or elements of the device for execution are mentioned in the above detailed description, such division is not mandatory. In fact, according to the implementation manners of the present disclosure, the features and functions of two or more components or elements described above may be embodied in one component or element. Conversely, the features and functions of one component or element described above may be further divided into multiple components or elements and embodied.

The present disclosure also provides a computer-readable storage medium, on which at least one computer program is stored, and the at least one computer program is executed by at least one processor to implement the information processing method. The method includes the following steps:

providing a direction indicator on the GUI, the direction indicator including a direction identifier for identifying a direction;

detecting a location marking operation, determining an marking location in the game scene according to the location marking operation, and acquiring direction information of the marking location; and at a position corresponding to the direction identifier corresponding to the direction information, generating a graphical identifier corresponding to the direction information of the marking location.

The present disclosure also provides an electronic device, includes: at least one processor; and at least one memory, configured to store at least one executable instruction of the at least one processor, and the at least one processor is configured to execute the executable instruction to perform the information processing method. The method includes the following steps:

providing a direction indicator on the GUI, the direction indicator including a direction identifier for identifying a direction;

detecting a location marking operation, determining an marking location in the game scene according to the location marking operation, and acquiring direction information of the marking location; and at a position corresponding to the direction identifier corresponding to the direction information, generating a graphical identifier corresponding to the direction information of the marking location.

Figure 7:
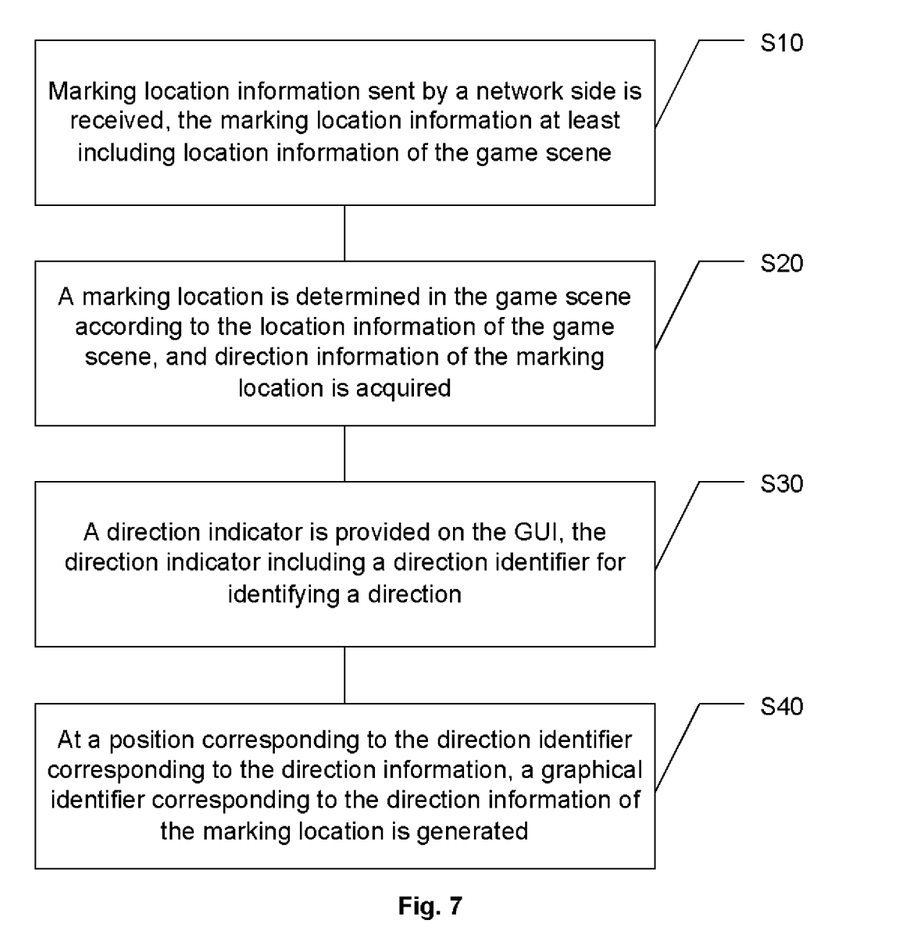
FIG. 7 is a flowchart of an information processing method according to another embodiment of the present disclosure.

The foregoing information processing method, information processing apparatus, computer-readable storage medium and electronic device of the present disclosure are also applicable to a multiplayer online game, in which players send marking locations to each other. That is, the mobile terminal on the marking location information sending side detects the location marking operation executed by the player, determines the marking location, and then sends marking location information to the mobile terminal on a receiving side through a network (which may be directly sent or forwarded by a server). The information at least includes location information of the marking location in the game scene. After receiving the marking location information, the mobile terminal on the receiving side determines the marking location in the local game scene, and then identifies the direction of the marking location by using the direction indicator according to the foregoing method. As shown in FIG. 7, specifically, for the mobile terminal on the receiving side, the information processing method is as follows.

At step S10, marking location information sent by a network side is received, the marking location information at least including location information of the game scene.

At step S20, a marking location is determined in the game scene according to the location information of the game scene, and direction information of the marking location is acquired.

At step S30, a direction indicator is provided on the GUI, the direction indicator including a direction identifier for identifying a direction.

At step S40, at a position corresponding to the direction identifier corresponding to the direction information, a graphical identifier corresponding to the direction information of the marking location is generated.

In view of the foregoing detailed description of the technical solutions of the present disclosure by steps S1, S2, and S3, the difference between the present embodiment and the foregoing is mainly that, in the present embodiment, the marking location is determined according to the marking location information sent by the network side. The technical solution described above is to determine the marking location according to the location marking operation executed by the player. Steps S30 and S40 of the present embodiment may adopt the solution consistent with steps S1 and S3 in the foregoing, in order to avoid redundancy, the following discloses contents that are not described above in detail, and the content already described above is not repeated here.

In an optional embodiment, at step S10, the marking location information sent by the network side includes: marking location information directly sent by other mobile terminals through the network, and marking location information forwarded by a game server after being sent from other mobile terminals to the game server. The present disclosure is not limited, and the developer may make a choice according to the needs of the game.

The location information of the game scene in the marking location information may be a specific coordinate or a relatively blurred location, such as a specific building model.

Since marking location information sent by different terminals may be received in a multiplayer online game, in order to distinguish senders, the marking location information may further includes an identifier of each sender, so that the display form of the corresponding graphical identifier may be controlled according to the identifier of each sender. That is, at least one of following parameters of the graphical identifier: the shape, size, color, brightness, transparency and dynamic effect is controlled according to the identifier of each sender. For example, graphical identifiers corresponding to marking locations sent by different terminals are represented by different colors respectively.

In an alternative embodiment, after receiving the marking location information, it is determined whether the marking location corresponding to the identifier of each sender already exists according to the identifier of each sender. If so, the existing marking location is eliminated, and a new marking location is re-determined.

Correspondingly, the present embodiment also provides an information processing apparatus applied to a receiving side. The apparatus includes:

a receiving component, configured to receive marking location information sent by a network side, the marking location information at least comprising location information of the game scene;

an marking location determination component, configured to determine a an marking location in the game scene according to the location information of the game scene, and acquire direction information of the marking location;

a direction indicator component, configured to provide a direction indicator on the GUI, the direction indicator comprising a direction identifier for identifying a direction;

a control component, configured to, at a position corresponding to the direction identifier corresponding to the direction information, generating a graphical identifier corresponding to the direction information of the marking location.

Correspondingly, the present embodiment also provides a computer-readable storage medium applied to a receiving side, on which at least one computer program is stored, and the at least one computer program is executed by at least one processor to implement the information processing method. The method includes the following steps:

receiving marking location information sent by a network side, the marking location information at least comprising location information of the game scene;

determining an marking location in a game scene according to the location information of the game scene, and acquiring direction information of the marking location;

providing a direction indicator on the GUI, the direction indicator comprising a direction identifier for identifying a direction; and at a position corresponding to the direction identifier corresponding to the direction information, generating a graphical identifier corresponding to the direction information of the marking location.

Correspondingly, the present embodiment also provides an electronic device applied to a receiving side, includes: at least one processor; and at least one memory, configured to store at least one executable instruction of the at least one processor, and the at least one processor is configured to execute the at least one executable instruction to perform the information processing method. The method includes the following steps:

receiving marking location information sent by a network side, the marking location information at least comprising location information of the game scene;

determining an marking location in a game scene according to the location information of the game scene, and acquiring direction information of the marking location;

providing a direction indicator on the GUI, the direction indicator comprising a direction identifier for identifying a direction; and at a position corresponding to the direction identifier corresponding to the direction information, generating a graphical identifier corresponding to the direction information of the marking location.

Those skilled in the art will appreciate that various aspects of the present disclosure may be implemented as a system, method, or program product. Therefore, various aspects of the present disclosure may be embodied in the form of a complete hardware implementation manner, a complete software implementation manner (including firmware, microcode, etc.), or a combined implementation manner of hardware and software, which may be collectively referred to as "circuit", "component" or "system".

Other embodiments of the present disclosure will be apparent to those skilled in the art after considering the specification and practicing the present disclosure herein. The present application is intended to cover any variations, uses, or adaptations of the present disclosure, which are in accordance with the general principles of the present disclosure and include common general knowledge or conventional technical means in the art that are not disclosed in the present disclosure. The specification and examples are to be regarded as illustrative only, and the true scope and spirit of the present disclosure are limited only by the appended claims.

What is claimed is:

1. An information processing method, applied to a mobile terminal on a receiving side which is rendered with a graphical user interface (GUI), contents rendered on the GUI at least partially comprising a first game scene and at least partially comprising a first virtual character controlled by the mobile terminal on the receiving side, the method comprising:

receiving a second marking location information sent by a mobile terminal on a sending side, the second marking location information at least comprising a second location information of a second game scene on the mobile terminal on the sending side and a relative distance of a second marking location relative to a second virtual character controlled by the mobile terminal on the sending side, wherein the second marking location information is a location information determined, by the mobile terminal on the sending side, according to a second location marking operation detected by the mobile terminal on the sending side;

determining a first marking location in the first game scene according to the second location information of the second game scene received from the mobile terminal on the sending side, and acquiring direction information of the first marking location;

providing a direction indicator on the GUI, the direction indicator comprising a direction identifier for identifying a direction;

at a position corresponding to the direction identifier corresponding to the direction information, generating a graphical identifier corresponding to the direction information of the first marking location; and controlling at least one of following parameters of a display form of the graphical identifier on the direction indicator according to the relative distance of the second marking location relative to the second virtual character controlled by the mobile terminal on the sending side: a shape, a size, a color, a brightness, a transparency and a dynamic effect of the graphical identifier.

2. The method as claimed in claim 1, further comprising: detecting a current orientation of the first virtual character in the first game scene, and marking the current orientation on the direction indicator.

3. The method as claimed in claim 2, wherein marking the current orientation on the direction indicator comprises:

displaying an orientation indication control on the GUI, and controlling the direction indicator to move on the GUI according to the current orientation, such that a position corresponding to the current orientation on the direction indicator is located at a position indicated by the orientation indication control.

4. The method as claimed in claim 1, wherein the direction identifier comprises at least one of the following: a direction scale and a direction descriptor.

5. The method as claimed in claim 1, wherein the direction information comprises at least one of the following: the direction information of the first marking location in the first game scene and the direction information of the first marking location relative to the first virtual character.

6. The method as claimed in claim 1, wherein the method further comprising:

marking the first marking location in the thumbnail of the game scene.

7. The method as claimed in claim 1, further comprising: providing a marking location cancelling control on the GUI; and when a trigger operation acting on the marking location cancelling control is detected, eliminating the first marking location and the graphical identifier corresponding to the first marking location.

8. The method as claimed in claim 1, wherein the second marking location information further comprises an identity of an identifier, the method further comprising:

controlling a display form of the graphical identifier according to the identity.

9. The method as claimed in claim 8, wherein controlling the display form of the graphical identifier according to the identity comprises:

controlling at least one of following parameters of the graphical identifier:

a shape, a size, a color, a brightness, a transparency and a dynamic effect.

10. The method as claimed in claim 1, wherein the second marking location information further comprises an identity of an identifier, the method further comprising:

determining whether the second marking location corresponding to the identity already exists according to the identity, and when the second marking location corresponding to the identity already exists, eliminating the existing second marking location, and re-determining a new second marking location corresponding to the identity.

11. An information processing apparatus, applied to a mobile terminal on a receiving side which is rendered with a GUI, contents rendered on the GUI at least partially comprising a first game scene and at least partially comprising a first virtual character controlled by the mobile terminal on the receiving side, the apparatus comprising: a hardware processor coupled with a memory and configured to execute program instructions stored on the memory, wherein the program instructions comprise:

receiving a second marking location information sent by at least one mobile terminal on a sending side, the second marking location information at least comprising a second location information of a second game scene on the mobile terminal on the sending side and a relative distance of a second marking location relative to a second virtual character controlled by corresponding to the mobile terminal on the sending side, wherein the second marking location information is a location information determined, by the mobile terminal on the sending side, according to a second location marking operation detected by the mobile terminal on the sending side;

determining a first marking location in the first game scene according to the second location information of the second game scene received from the mobile terminal on the sending side, and acquiring direction information of the first marking location;

providing a direction indicator on the GUI, the direction indicator comprising a direction identifier for identifying a direction;

at a position corresponding to the direction identifier corresponding to the direction information, generating a graphical identifier corresponding to the direction information of the first marking location; and controlling at least one of following parameters of a display form of the graphical identifier on the direction indicator according to the relative distance of the second marking location relative to the second virtual character controlled by the mobile terminal on the sending side: a shape, a size, a color, a brightness, a transparency and a dynamic effect of the graphical identifier.

12. A non-transitory computer-readable storage medium, on which at least one computer program is stored, wherein the at least one computer program is executed by at least one processor to implement the following steps:

receiving a second marking location information sent by a mobile terminal on a sending side, the second marking location information at least comprising a second location information of a second game scene on the mobile terminal on the sending side and a relative distance of a second marking location relative to a second virtual character controlled by the mobile terminal on the sending side, wherein the second marking location information is a location information determined, by the mobile terminal on the sending side, according to a second location marking operation detected by the mobile terminal on the sending side;

determining a first marking location in the first game scene according to the second location information of the second game scene received from the mobile terminal on the sending side, and acquiring direction information of the first marking location;

providing a direction indicator on the GUI, the direction indicator comprising a direction identifier for identifying a direction;

at a position corresponding to the direction identifier corresponding to the direction information, generating a graphical identifier corresponding to the direction information of the first marking location; and controlling at least one of following parameters of a display form of the graphical identifier on the direction indicator according to the relative distance of the second marking location relative to the second virtual character controlled by the mobile terminal on the sending side: a shape, a size, a color, a brightness, a transparency and a dynamic effect of the graphical identifier.

13. The non-transitory computer-readable storage medium as claimed in claim 12, wherein the at least one computer program is executed by the at least one processor to further implement the following steps:

detecting a current orientation of the first virtual character in the first game scene, and marking the current orientation on the direction indicator.

14. The non-transitory computer-readable storage medium as claimed in claim 13, wherein marking the current orientation on the direction indicator comprises:

displaying an orientation indication control on the GUI, and controlling the direction indicator to move on the GUI according to the current orientation, such that a position corresponding to the current orientation on the direction indicator is at an indication location of the orientation indication control.

15. The non-transitory computer-readable storage medium as claimed in claim 12, wherein the direction information comprises at least one of the following: the direction information of the first marking location in the first game scene and the direction information of the first marking location relative to the first virtual character.

16. The non-transitory computer-readable storage medium as claimed in claim 12, wherein content displayed by the GUI further comprises a thumbnail of the game scene for displaying thumbnail information of an entire or partial game scene, the at least one computer program is executed by the at least one processor to further implement the following steps:

marking the first marking location in the thumbnail of the game scene.

17. The non-transitory computer-readable storage medium as claimed in claim 12, wherein the at least one computer program is executed by the at least one processor to further implement the following steps:

providing a marking location cancelling control on the GUI; and when a trigger operation acting on the marking location cancelling control is detected, eliminating the first marking location and the graphical identifier corresponding to the first marking location.

18. An electronic device, comprising:

at least one processor; and at least one memory, configured to store at least one executable instruction of the at least one processor, wherein the at least one processor is configured to execute the at least one executable instruction to perform the information processing method as claimed in claim 1.

* * * * *